UNITED STATES PATENT OFFICE.

ERNST UHLMANN, OF DOBBS FERRY, NEW YORK, ASSIGNOR TO THE NON-INTOXICANT BEVERAGE COMPANY, OF NEW YORK.

MANUFACTURE OF NON-INTOXICATING BEVERAGES.

SPECIFICATION forming part of Letters Patent No. 613,915, dated November 8, 1898.

Application filed January 24, 1898. Serial No. 667,805. (No specimens.)

*To all whom it may concern:*

Be it known that I, ERNST UHLMANN, a subject of the Emperor of Germany, residing at Dobbs Ferry, in the county of Westchester and State of New York, have invented certain new and useful Improvements in the Manufacture of Non-Intoxicating Beverages, of which the following is a specification.

This invention relates to improvements in the manufacture of non-intoxicating beverages; and it consists particularly in a method whereby a beverage similar to beer in taste and nutritive qualities but having an extremely low per cent. of alcohol is obtained.

In carrying out my invention I proceed with the usual methods of mashing the usual raw materials for beer-mashing, with the exception that I only use very high temperatures, (170° Fahrenheit to 175° Fahrenheit.) By doing so I produce more dextrine than maltose. The dextrine cannot be converted in the process of fermentation into carbonic-acid gas and alcohol. Consequently my product will have a higher percentage of extract and less of alcohol than would be the case if I followed the usual mashing methods. I run the malt and water together into the operating mash-tub. The mash should never be lower at any time than 170° Fahrenheit nor higher than 175° Fahrenheit. After the mixing the mash should be allowed to rest, as in common practice, and then the usual processes of sparging and racking and boiling should be proceeded with. In the use of hops I do not limit myself as to the quantity which should be used, as that is a matter of fancy and taste and is no factor in my process. The wort is then run over the cooler to the fermenting-tub, as is common in brewery practice. When in the fermenting-tub, I add yeast of the Frohberg type on account of its high fermenting power. For the method of preparation of such yeast see *Handbuch fur den Americanischen Brauer und Malster*, by Ernst Hantke, Milwaukee, Wisconsin, page 160. During the period of fermentation I pump air into the fermenting-tub for at least two hours a day until the product has reached the hochkraeusen stage. The addition of air gives nourishment to the yeast and at the same time evaporates the carbonic-acid gas and small proportions of alcohol contained in the liquid. The hochkraeusen stage is characterized by a greater agitation of the yeast-cells, producing a much higher foam than the regular kraeusen stage. From the hochkraeusen period I allow the liquid to continue its fermentation until it has converted all the fermentable matter. Then the liquid is boiled, evaporating all the alcohol and carbonic-acid gas, leaving a product containing all the extractive matters but without the taste of beer. To this boiled product after being cooled I add fifteen per cent. of kraeusen of a low original gravity, so as to restore the taste, appearance, and effervescence of lager-beer. Afterward it is refined, bunged, filtered, and racked off, as in the usual finishing of beer ready for market. In the manufacture of lager-beer in the United States the gravity of the beer is commonly measured with a Balling saccharometer. The gravity of liquor aimed at by brewers generally is from eleven to fifteen per cent. on this scale. By "low original gravity" I mean a gravity less than eleven per cent. or less than the common average.

I may carbonate the beer in any ordinary or preferred way, instead of by using kraeusen; but I have found that kraeusen not only carbonates but restores to the beer the true beer taste that has been impaired by the boiling process.

By the above process I produce a beverage having substantially the taste, appearance, and effervescing qualities of beer and containing as much or even more extractive matter, but without intoxicating property, as it contains less than two per cent. of alcohol.

My process also enables the utilization of spoiled fermented liquors of various kinds by boiling the same to remove all alcohol and carbonic acid therefrom and then combining the resultant product in a cool condition with ordinary beer kraeusen so as to restore the taste and effervescence of beer. By this means I am enabled to put in marketable condition any spoiled fermented liquors made from malt or malt substitutes—such as beer, malt-wine, malt-tonic, ale, temperance beer, and all manufactures of a similar character which have become unfit for use.

I am aware that it has been proposed to condense ordinary beer by evaporation under a vacuum and at a temperature of 120° to 160° Fahrenheit, making a product which is more readily transportable and is adapted to be subsequently diluted with water and with alcohol and, if desired, carbonated, to bring it to the original condition again. In such a process the evaporation of a large proportion of the water would of course necessarily be accompanied or preceded by the evaporation of the alcohol and carbonic acid of the beer; but while my process involves the driving off of the alcohol and (incidentally) the carbonic acid it does not contemplate the evaporation of any material part of the water, and is therefore not a process of condensation. The purposes of this invention are to produce with the minimum of cost a liquor having a very small proportion of alcohol, but having the taste, appearance, and largely the nutritive value of beer, and the boiling operation is therefore carried out no further than is necessary to eliminate the alcohol to the requisite extent. Owing to the greater volatility of alcohol it will of course evaporate first, and, in fact, according to the known laws of evaporation the water will not begin to evaporate until the alcohol has substantially disappeared, and by stopping the evaporating process at this point I obviate the expense of boiling away a large quantity of water. Such an expense in the present case would be practically prohibitory.

A further distinction of my process is that I use a much higher temperature than is generally considered safe in the treatment of fermented beer. It is well known that a temperature in the neighborhood of 150° to 160° Fahrenheit, such as is used in pasteurizing, is about the maximum that the fermented beer will stand without seriously deteriorating its taste, and that as we go above this temperature the effect on the taste becomes more marked until at a boiling temperature (212° Fahrenheit) the beer is practically spoiled for ordinary purposes. This effect is due to the coagulation of the albuminoid substances in the beer by the excessive heat. In my process these substances are, after being thus coagulated, settled out and are thus completely removed from the liquor, which is thus without the characteristic taste of beer, but contains an even larger proportion of nutritive matter (dextrine, &c.) than ordinary beer. In this case, as in the prior process referred to, and, in fact, in the case of any malt liquor which has been completely fermented, there will be substantially no fermentable sugar left in the liquor, and in order to induce fermentation therein it is therefore not sufficient to merely add a fermenting organism, such as yeast, thereto. Food for this organism in the shape of fermentable sugar must also be supplied, and it is to supply both the organism and its food that I add the kraeusen in the after fermentation. The kraeusen being of low gravity the fermentation will be slow and can therefore be more readily regulated, and this result is aided by the fact that the albuminoids from the original wort having been coagulated and precipitated by the heat the fermenting organism has but little nitrogenous matter for its development, which therefore takes place slowly and can be limited with ease and exactness. Moreover, owing to this deficiency of unstable albuminoid matter in the liquor it is enabled to keep much better after it is put up.

My invention therefore comprises the following distinctive characteristics:

First. The use of an original mashing process which will give a minimum of fermentable sugar and a maximum of unfermentable sugar and extract.

Second. The driving off of the alcohol without any substantial evaporation of water.

Third. The use of a temperature in evaporating which is sufficient to coagulate the unstable albuminoids, and thus render the final product more stable.

Fourth. The addition to the liquor, which is free from alcohol, fermentable sugar, and carbonic acid, of sufficient kraeusen to supply not only the ferment necessary, but enough food therefor to furnish the requisite amount of alcohol and carbonic acid to give the desired taste and sparkle to the liquor.

Having thus described my invention, what I claim as new, and desire to secure by Letters Patent, is—

1. A process for producing a beverage from fermented-malt liquor, consisting in boiling the same sufficiently to remove all the alcohol and carbonic acid, but substantially none of the water, such boiling being effected at a temperature sufficient to coagulate the albuminoids, removing the albuminoids, and subsequently adding kraeusen thereto and fermenting to restore the taste, appearance and effervescence of beer.

2. A process for producing a beverage from fermented-malt liquor, consisting in boiling the same sufficiently to remove all the alcohol and carbonic acid, but substantially none of the water, such boiling being effected at a temperature of substantially 212° Fahrenheit, to coagulate all the albuminoids, removing the albuminoids, and subsequently adding kraeusen of low original gravity and fermenting to restore the taste, appearance and effervescence of beer.

3. A process for making a non-intoxicating beverage which consists in mashing malt at a temperature of substantially from 170° Fahrenheit, to 175° Fahrenheit, extracting the wort therefrom, and fermenting the same until all fermentable matter has been converted, boiling the resulting product to remove alcohol and carbonic-acid gas while retaining substantially all of the water, adding a small proportion of kraeusen and fermenting to restore the taste, appearance and effervescence of beer.

4. A process for making a non-intoxicating beverage which consists in mashing malt at a temperature of substantially from 170° to 175° Fahrenheit, extracting the wort therefrom and fermenting same until all fermentable matter has been converted, boiling the resulting product sufficiently to remove substantially all the alcohol and carbonic acid, without removing any substantial proportion of water, such boiling being effected at a temperature of substantially 212° Fahrenheit, so as to coagulate the albuminoids, removing such albuminoids, and subsequently adding a small proportion of kraeusen and fermenting the mixture to restore the taste, appearance and effervescence of beer.

5. A process for making a non-intoxicating beverage consisting in mashing malt at a temperature of substantially 170° to 175° Fahrenheit, extracting the wort therefrom, and fermenting same with yeast of high fermenting power, until all fermentable matter has been converted, boiling the resulting product sufficiently to remove all the alcohol, and carbonic acid, but substantially none of the water, adding a small proportion of kraeusen of low original gravity and fermenting so as to restore the taste, appearance and effervescence of lager-beer.

6. A process for making a non-intoxicating beverage which consists in mashing malt at a temperature of 170° Fahrenheit to 175° Fahrenheit, extracting the wort therefrom and fermenting same with yeast of high fermenting power, passing air through the wort until it has reached the hochkraeusen stage, then allowing fermentation to continue until all fermentable matter has been converted, boiling the resulting product to remove alcohol and carbonic-acid gas without removing any substantial proportion of water, and adding a small proportion of kraeusen of low original gravity so as to restore the taste, appearance and effervescence of lager-beer.

ERNST UHLMANN.

Witnesses:
G. A. TAYLOR,
HARRY E. KNIGHT.